United States Patent
Schnepf

(12) 
(10) Patent No.: US 6,401,896 B1
(45) Date of Patent: Jun. 11, 2002

(54) LUBRICATING DEVICE FOR WET MULTI-DISK CLUTCH

(75) Inventor: Wolfgang Schnepf, Wiernsheim (DE)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 09/631,653

(22) Filed: Aug. 3, 2000

(30) Foreign Application Priority Data

Aug. 7, 1999 (DE) .......................... 199 37 440

(51) Int. Cl.[7] .............................................. F16D 13/74
(52) U.S. Cl. ................... 192/70.12; 192/113.34
(58) Field of Search ........................ 192/70.12, 113.34, 192/89.26

(56) References Cited

U.S. PATENT DOCUMENTS

| | | | |
|---|---|---|---|
| 3,249,189 A | * | 5/1966 | Schjolin et al. .......... 192/70.12 |
| 3,823,802 A | | 7/1974 | Winzeler et al. |
| 4,446,953 A | | 5/1984 | Voss et al. |
| 4,540,077 A | * | 9/1985 | Yamamoto et al. ....... 192/70.12 |
| 4,566,572 A | * | 1/1986 | Flotow et al. ............ 192/70.12 |
| 4,751,989 A | * | 6/1988 | Shinokawa et al. .... 192/70.12 X |
| 5,400,884 A | * | 3/1995 | Matsuoka ............ 192/70.12 X |
| 5,706,694 A | * | 1/1998 | Bhookmohan et al. .. 192/70.12 X |

FOREIGN PATENT DOCUMENTS

| | | |
|---|---|---|
| EP | 0 762 004 A2 | 3/1997 |
| JP | 56-28321 A | 5/1981 |
| JP | 4-78325 | * 3/1992 |
| JP | 5-231446 | * 9/1993 |

* cited by examiner

Primary Examiner—Rodney H. Bonck
(74) Attorney, Agent, or Firm—Michael Best & Friedrich LLP

(57) ABSTRACT

This lubricating device for a wet multi-disk clutch, which is suitable particularly for use in internal combustion engines of motorcycles, comprises several disks, which are combined into a disk package between an outer hub and an inner hub and surround the outside of a jacket part of the inner hub and, over openings of the lubricating device in the jacket part, are supplied with lubricating oil from a drive shaft having a borehole. To achieve optimum lubrication of the disks, the inside of the jacket part, which is provided with openings, is provided, as seen in the axial direction of the jacket part, with a bevel, which extends from a bottom to a free end of the inner hub, which has a radial oil-damming web and is adjacent to the free end.

20 Claims, 3 Drawing Sheets

LUBRICATING DEVICE FOR WET MULTI-DISK CLUTCH

The invention relates to a lubricating device for a wet multi-disk clutch, which is suitable, particularly, for use in internal combustion engines of motorcycles.

A wet multi-disk clutch, known from U.S. Pat. No. 3,823,802, comprises a hub with a jacket part, which is surrounded by a disk package. A lubricating device, which has opening in the jacket part, supplies lubricating oil to the disks of the disk package.

Moreover, a wet multi-disk clutch is known from EP 0 762 004 A2, the disks of which have ring openings, which permeate the jacket part. The inside of the jacket part is provided with a bevel which, as seen in the axial direction of the jacket part, becomes wider from the inside to the outside.

It is an object of the invention to provide a lubricating device for a wet multi-disk clutch, by means of which, with simple means, lubricating oil selectively reaches the disks through openings in the jacket part.

The main advantages, achieved by the invention, are seen to lie therein that lubricating oil for the disks, which tends to flow to the free end of the jacket part, because of the rotation of the wet multi-disk clutch and because of the bevels of the jacket part of the inner hub, is restrained functionally properly by the oil-damming web. By these means, said lubricating oil selectively reaches the disks through openings in the jacket part. This is also supported further by the control chambers, which are formed by chamber webs. Moreover, the hub is a casting and the bevel of the jacket part is required for shaping the casting. An advantageous construction is achieved if the chamber webs are produced in one piece with the hub. The oil-damming web can be produced as well as installed in a simple manner. Finally, the openings of the lubricating device in the extension of the jacket part and the openings in the bottom of the jacket part make it possible that the outer disks of the disk package are also lubricated effectively.

Figure 1:
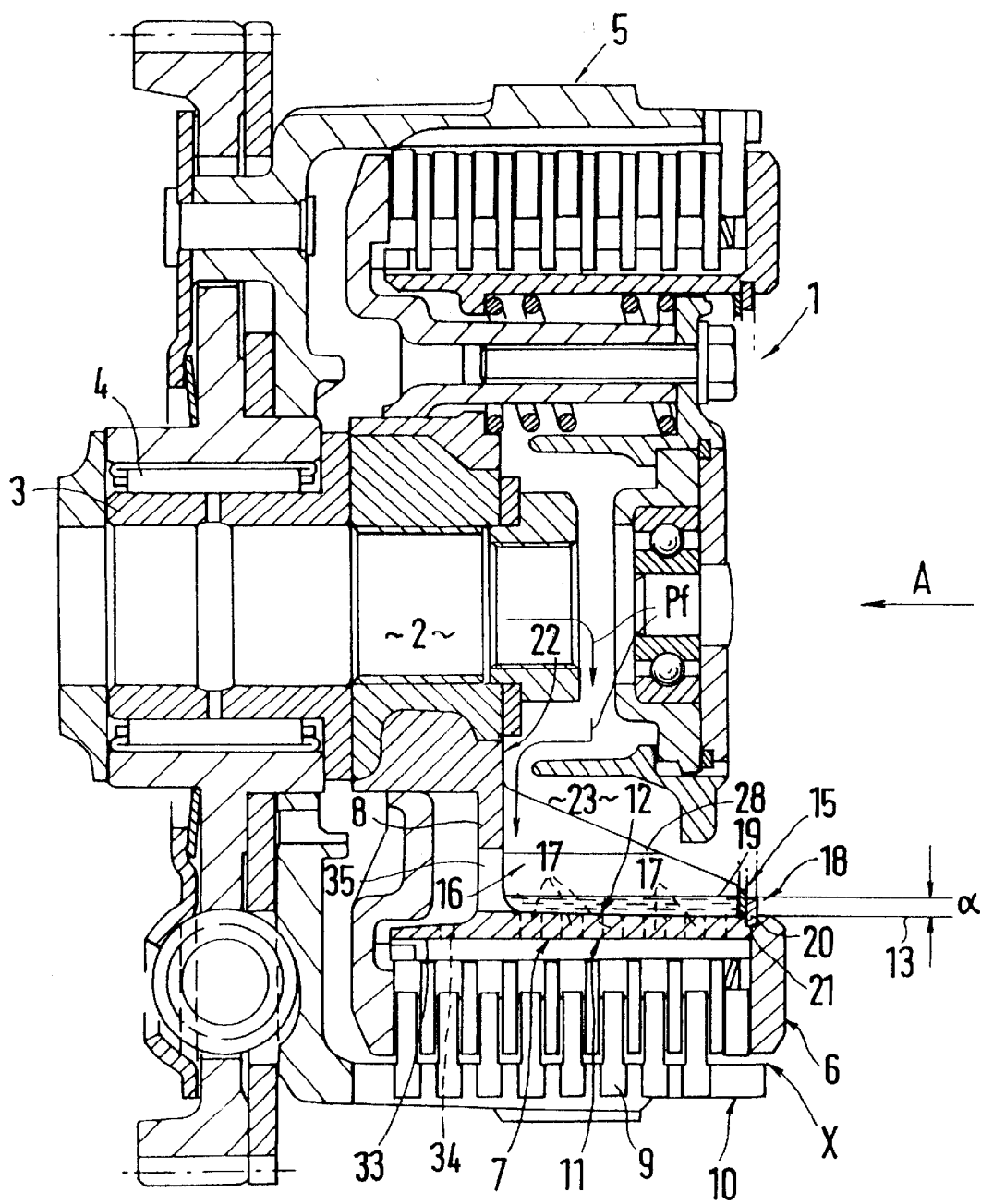
Figure 2:
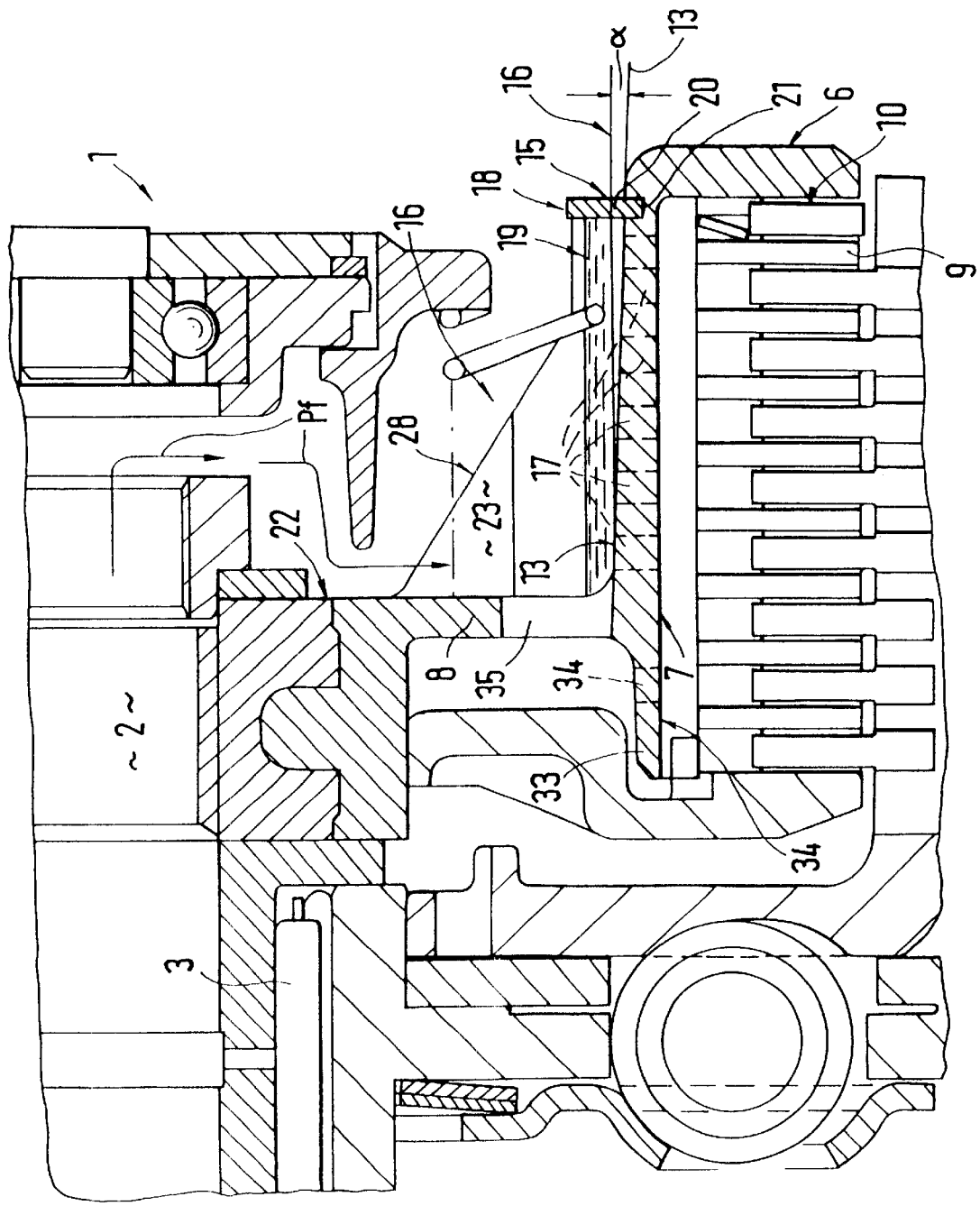
Figure 3:
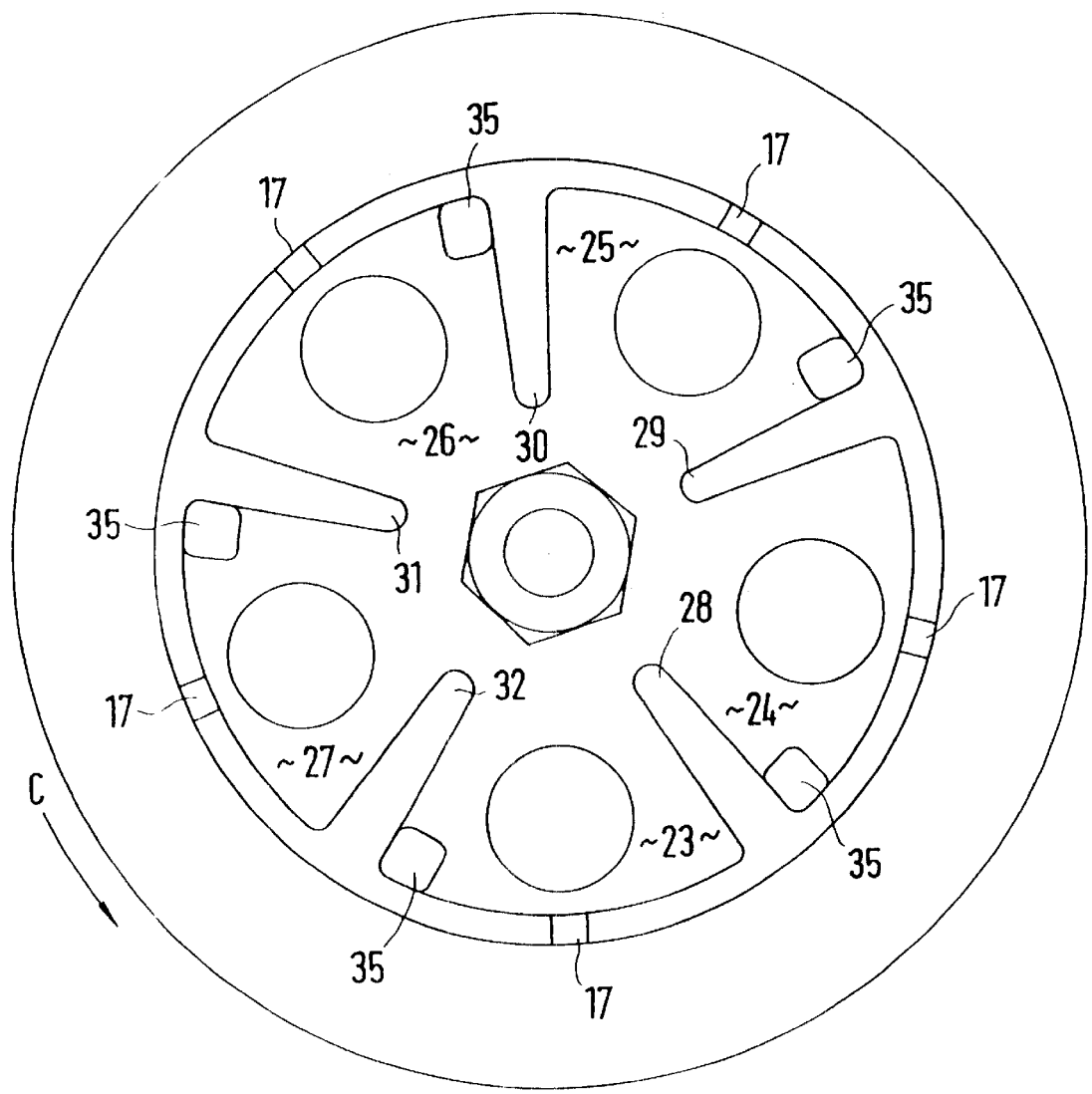

An example of the invention is described in greater detail below and shown in the drawing, in which FIG. 1 shows a cross-section through a wet multi-disk clutch with the inventive lubricating device, FIG. 2 shows a detail X of FIG. 1 on a larger scale and FIG. 3 shows a diagrammatic view in the direction of arrow A of FIG. 1.

A wet multi-disk clutch 1, which is suitable for use in internal combustion engines of motorcycles, is provided with a drive shaft 3, which has an internal borehole 2 and on which an outer hub 5 is mounted by means of an anti-friction bearing 4. An inner hub 6 is connected with the drive shaft 3 so that there can be no mutual rotation and comprises a jacket part 7 of cylindrical shape and a bottom 8. Between the outer hub 5 and the inner hub 6, a disk package 10 having several disks 9 is provided, the disks 9 surrounding an outside 11 of the jacket part 7. An inside 12 of the jacket part 7 of the inner hub 6, which is constructed as a casting is, as seen in the axial direction of the jacket part, provided with a bevel 13, which extends between the radial bottom 8 and a free end 15 of the inner hub 6. The bevel 13, which serves for shaping the casting, proceeds at an angle of 1 to 3, relative to a horizontal 16.

For supplying lubricating oil to the disks 9, a lubricating device 16 is provided, which conveys a suitable medium from the inner borehole 2 of the drive shaft 3 to the inside 12 of the jacket part 7. In the jacket part 7, several openings 17 are provided in the axial direction, over which the lubricating oil reaches the disks 9 (arrow Pf). Adjacent to the free end 15 of the jacket part 7, a radial oil-damming web 18 is disposed, which sees to it that an oil level 19 built up at the inside 12 of the jacket part 7 during the operation of the wet multi-disk clutch 1. The oil-damming web 18 is formed by a ring 20, which is fastened to the inside 12 of the jacket part 7 and, in the example, is detachably inserted into a groove 21.

Between the inner region 22 of the bottom 8 of the inner hub 6 and the oil-damming web 18, several control chambers 23, 24, 25, 26 and 27 are installed. The latter are formed by chamber webs 28, 29, 30, 31 and 32, which extend axially and radially at the inside 12 from the inner region 22 of the bottom 8 to the oil-damming web 18 and are produced in one piece with the inner hub 6. The openings 17 are provided in the region of each control chamber, for example, 23, as a result of which an optimum supply of lubricating oil to the disks 9 is achieved.

The inner hub 6, as seen in the axial direction, is provided with an extension 33 of the jacket part 7, which is taken beyond the bottom 8 and in which openings 34 of the lubricating device 12 are provided. The lubricating oil reaches these openings 34 through the openings 35, which are machined into the bottom 8 of the jacket part 7. The openings 35 are provided in each case directly next to the chamber webs 28, 29, 30, 31 and 32 and, moreover, as seen in the direction of rotation C of FIG. 3, ahead of said chamber webs.

What is claimed is:

1. A wet multi-disk clutch comprising:
   an outer hub, an inner hub, and a plurality of disks between the outer hub and the inner hub, the inner hub having a bottom and a jacket part, the jacket part defining a free end, a radial oil-damming web adjacent the free end, an outside, an inside, and a plurality of openings extending between the outside and the inside adjacent the disks for supplying a lubricating oil to the disks, the inside of the jacket part including a beveled surface extending from the bottom to the free end;
   wherein the inner hub further comprises radially and axially extending chamber webs extending between the bottom and the oil-damming web, the chamber webs defining control chambers.

2. The wet multi-disk clutch of claim 1, wherein the chamber webs are integral with the inner hub.

3. The wet multi-disk clutch of claim 1, wherein at least one of the openings is positioned in each of the control chambers.

4. The wet multi-disk clutch of claim 1, wherein the oil-damming web is a ring coupled to the inside of the jacket part.

5. The wet multi-disk clutch of claim 4, wherein the ring is detachably coupled to the jacket part.

6. The wet multi-disk clutch of claim 5, wherein the inside of the jacket part includes a groove for receiving the ring.

7. The wet multi-disk clutch of claim 1, wherein the jacket part includes an annular extension extending axially past the bottom in a direction away from the free end, the extension including additional openings for supplying a lubricating oil to the disks, the lubricating oil being supplied to the additional openings via bottom openings in the bottom of the inner hub.

8. The wet multi-disk clutch of claim 7, wherein each bottom opening is positioned adjacent a respective one of the chamber webs.

9. A wet multi-disk clutch comprising:
   an outer hub, an inner hub, and a plurality of disks between the outer hub and the inner hub, the inner hub having a bottom and a jacket part, the jacket part defining a free end, a radial oil-damming web adjacent the free end, an outside, an inside, and a plurality of openings extending between the outside and the inside adjacent the disks for supplying a lubricating oil to the disks, the inside of the jacket part including a beveled surface extending from the bottom to the free end;

wherein the jacket part further includes an annular extension extending axially past the bottom in a direction away from the free end, the extension including additional openings for supplying a lubricating oil to the disks, the lubricating oil being supplied to the additional openings via bottom openings in the bottom of the inner hub.

10. The wet multi-disk clutch of claim 9, wherein the inner hub further comprises radially and axially extending chamber webs extending between the bottom and the oil-damming web, the chamber webs defining control chambers.

11. The wet multi-disk clutch of claim 10, wherein each bottom opening is positioned adjacent a respective one of the chamber webs.

12. The wet multi-disk clutch of claim 10, wherein the chamber webs are integral with the inner hub.

13. The wet multi-disk clutch of claim 10, wherein at least one of the openings extending between the outside and the inside of the jacket part is positioned in each of the control chambers.

14. The wet multi-disk clutch of claim 9, wherein the oil-damming web is a ring coupled to the inside of the jacket part.

15. The wet multi-disk clutch of claim 14, wherein the ring is detachably coupled to the jacket part.

16. The wet multi-disk clutch of claim 15, wherein the inside of the jacket part includes a groove for receiving the ring.

17. A wet multi-disk clutch comprising:

an outer hub, an inner hub, and a plurality of disks between the outer hub and the inner hub, the inner hub having a bottom and a jacket part, the jacket part defining a free end, an outside, an inside, and a plurality of openings extending between the outside and the inside adjacent the disks for supplying a lubricating oil to the disks;

wherein the jacket part further includes an annular extension extending axially past the bottom in a direction away from the free end, the extension including additional openings for supplying a lubricating oil to the disks, the lubricating oil being supplied to the additional openings via bottom openings in the bottom of the inner hub.

18. The wet multi-disk clutch of claim 17, wherein the inner hub further comprises radially and axially extending chamber webs extending between the bottom and the free end, the chamber webs defining control chambers.

19. The wet multi-disk clutch of claim 18, wherein each of the bottom openings is in a respective one of the control chambers.

20. The wet multi-disk clutch of claim 18, wherein each of the bottom openings is adjacent a respective one of the chamber webs.

* * * * *

UNITED STATES PATENT AND TRADEMARK OFFICE
CERTIFICATE OF CORRECTION

PATENT NO. : 6,401,896 B1  Page 1 of 1
DATED : June 11, 2002
INVENTOR(S) : Schnepf It is certified that error appears in the above-identified patent and that said Letters Patent is hereby corrected as shown below:

Title page,
Item [56], References Cited, FOREIGN PATENT DOCUMENTS, insert the following foreign patent references:
-- DE    3133478C2    8/1986
   DE    4341953A1    1/1995
   EP    0822350A2    2/1998 --

Signed and Sealed this

First Day of April, 2003

JAMES E. ROGAN
*Director of the United States Patent and Trademark Office*